United States Patent
Spannbauer et al.

(10) Patent No.: US 6,551,389 B2
(45) Date of Patent: Apr. 22, 2003

(54) SOUND TRANSMITTING AIR FILTER

(75) Inventors: Helmut Spannbauer, Moeglingen (DE); Juergen Freisinger, Asperg (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/083,643

(22) Filed: Feb. 27, 2002

(65) Prior Publication Data

US 2002/0124734 A1 Sep. 12, 2002

Related U.S. Application Data

(63) Continuation of application No. PCT/EP00/07619, filed on Aug. 5, 2000.

(30) Foreign Application Priority Data

Aug. 27, 1999 (DE) .......................... 199 40 610

(51) Int. Cl.$^7$ .............................. B01D 46/00
(52) U.S. Cl. ................. 96/380; 96/383; 55/385.3; 55/490; 55/DIG. 28
(58) Field of Search .................. 96/380, 381, 383, 96/384, 388, 414, 415, 416; 55/385.3, 490, 503, 529, DIG. 28; 123/198 E

(56) References Cited

U.S. PATENT DOCUMENTS

| | | | | |
|---|---|---|---|---|
| 2,340,152 A | * | 1/1944 | Steensen ...................... | 96/380 |
| 3,563,010 A | * | 2/1971 | Wheatley ..................... | 55/510 |
| 4,482,367 A | * | 11/1984 | Hashizume ................. | 174/15.1 |
| 4,509,613 A | * | 4/1985 | Yamaguchi ................. | 180/219 |
| 5,393,315 A | * | 2/1995 | Alliston et al. ............. | 110/216 |
| 5,649,986 A | | 7/1997 | Mueller | |
| 2002/0002906 A1 | * | 1/2002 | Fuesser ....................... | 96/381 |

FOREIGN PATENT DOCUMENTS

| | | | |
|---|---|---|---|
| DE | 195123 | 1/1907 | |
| DE | 3011294 | 10/1981 | |
| DE | 197 04 376 A1 | * 8/1998 | ........... F02B/77/08 |
| EP | 0186754 | 4/1989 | |
| GB | 1045309 | 10/1966 | |
| WO | 01/16477 | 3/2001 | |

OTHER PUBLICATIONS

"Flexi–System Air Box/Filter", Research Disclosure, GB, Industrial Opportunities Ltd. (Sep. 1997).
Copy of the search report.

* cited by examiner

Primary Examiner—Duane Smith
Assistant Examiner—Jason M. Greene
(74) Attorney, Agent, or Firm—Crowell & Moring LLP

(57) ABSTRACT

An air filter (10) for an internal combustion engine of a motor vehicle designed to transmit sound into the passenger compartment or driver area in order to inform the driver of the operating state of the engine. The air filter includes an air filter housing (11), a filter insert (26), an air inlet (12) for unfiltered air, and an air outlet (13) for filtered air. The air filter housing (11) includes a housing wall (22) in or on which at least one membrane (16) is mounted. The membrane (16) is made of a material which is more permeable to sound than the rest of the housing wall (22), so that the shape and position of the membrane can be used to achieve a desired sound generation and distribution.

6 Claims, 3 Drawing Sheets

SOUND TRANSMITTING AIR FILTER

CROSS REFERENCE TO RELATED APPLICATIONS

This application is a continuation of international patent application no. PCT/EP00/07619, filed Aug. 5, 2000, designating the United States of America, the entire disclosure of which is hereby incorporated herein by reference. Priority is claimed based on Federal Republic of Germany application no. 199 40 610.3, filed Aug. 27, 1999.

BACKGROUND OF THE INVENTION

This invention relates to an air filter for an internal combustion engine including an air filter housing which encloses a filter space and has a housing wall, an air inlet,.and an air outlet. The invention further relates to a method of producing such an air filter.

It is generally known that all vehicles are subject to regulations regarding maximum permissible noise emission. The automobile manufacturers are therefore obliged to build low-noise vehicles as far as possible. Due to the low noise emission of the vehicle and the high sound insulation of the passenger compartment, the driver typically receives information on the operating state of the engine only through the speedometer. Many drivers perceive this as a drawback.

Federal republic of Germany published patent application no. DE 197 04 376 A1 discloses an air filter arrangement with an conduit having an acoustic effective leading from the air filter to the passenger compartment. This conduit is intended to transmit sound into the passenger compartment and to inform the driver of the operating state of the engine. The conduit is sealed in an airtight manner by a membrane, which vibrates during operation and transmits these vibrations into the passenger compartment. The drawback of this solution is the use of an additional component, which must be extended through the engine compartment all the way to the passenger compartment or driver's compartment. The installation space required for this purpose is available only to a limited extent in the complex construction of today's vehicles and furthermore this structural assembly results in an increase in weight.

SUMMARY OF THE INVENTION

It is an object of the invention to provide means for influencing the intake noise of an internal combustion engine of a motor vehicle.

Another object of the invention is to provide an intake noise influencing air filter which does not substantially change the parts weight or the required installation space.

These and other objects of the invention are achieved by providing an air filter for an internal combustion engine, comprising an air filter housing having a housing wall which encloses a filter space, an unfiltered air inlet, and a filtered air outlet, wherein the housing wall includes at least one membrane portion that is more permeable to sound than the rest of the housing wall.

In accordance with a further aspect of the invention, the objects are achieved by providing a method of producing a sound transmitting filter housing comprising injection molding a filter housing of synthetic resin material with a housing wall and a membrane portion which has a greater permeability to sound than the rest of the housing wall.

The air filter according to the invention is advantageously suited to transmit sound such that the driver receives sufficient information on the operating state of the engine. The membrane, which is integrated in the housing wall and emits more sound than the housing wall itself, serves this purpose. By suitably arranging the membranes, e.g., directing them toward the engine, the intake noise can be reduced.

The membrane is connected with the housing wall to form a seal and thus represents a part of the boundary for a filter chamber. It must be installed on or in the housing wall in such a way that the air filter is sufficiently tight in every operating state. It must be kept in mind that the air filter is subjected to dynamic stresses in the form of air pressure changes, and that the membrane must not become detached from the housing wall and does not allow air leakage in any operating state. To this end, the membrane can be mounted on the housing wall from the outside or the inside. In either variant, a sufficient number of mounting points connecting the membrane to the housing wall must be provided.

The membrane is moreover configured in such a way that the air flowing through the filter, which comes from the inlet and flows through a filter element to the outlet, causes it to vibrate. These vibrations are transmitted to the surrounding components in the engine compartment and are finally directed into the passenger compartment or driver compartment. Depending on the requirements and the desired sound, several membranes of different shapes and sizes may be provided. Some possible shape variants involve the use of angular or oval membranes, which may have differently configured sound transmitting areas.

The membrane can be joined to the housing wall by gluing so as to form a seal. If the membrane is made of the same material as the filter housing, it can form an integral part of the filter housing. This avoids any possible leaks and saves assembly steps. A particularly suitable production method is the injection molding process.

One advantageous embodiment of the inventive concept involves the use of membranes with round or circular effective sound transmitting areas since they can be induced to vibrate particularly easily. Possible variants include embodiments in which angular membranes are inserted into the housing, but the effective sound transmitting areas themselves have round contours.

According to a further embodiment of the invention, the wall of the membrane can vary in its thickness. It is advantageous to make the areas of the edges of the membrane thin and the center area thick. As a result, the membrane can be quickly induced to vibrate but due to the thicker center area has sufficient mass to transmit the vibrations.

It is advantageous to give the membrane an undulating structure, which allows the membrane to vibrate more easily. A particularly advantageous solution is an embodiment where the membrane has an undulating structure along the periphery and a flat center area. In this case, the undulating area along the periphery can produce vibrations, which are then emitted by the flat center area. This embodiment provides the best results with respect to sound production and sound transmission.

In one specific embodiment, the membrane is arranged on an end face of the air filter housing. The end face is defined as the side, which the airflow meets after flowing through the air filter medium, so that the flow strikes the membrane directly and induces it to vibrate. This embodiment thus provides optimal sound transmission.

To install the membrane in the filter housing, it is advantageous to provide receiving or attachment areas in the filter housing. These receiving areas are used, for instance, to clip several mounting points of the membrane into the filter housing so that an adequate seal is provided, or to press the membrane into a circumferential groove on the filter housing, which receives the membrane and thus effects a sealing connection of the components. Other receiving areas can be configured in such a way that the melt of the membrane penetrates them and thereby effects an interlocking or form-fit connection between the membrane and the filter housing. In this case, the attachment area may take the form of conical bores with the cone opening toward the side opposite the membrane so that the membrane cannot fall out without being destroyed.

One method for producing the membrane and the filter housing is an injection molding process. The filter housing can be produced at a different location than the membrane. Moreover, a separate material can be selected for each component. The parts are subsequently joined.

A preferred variant is to make the membrane and the filter housing from the same material and in a single operation. In this case, the area of the membrane is distinguished from the filter housing wall only in its shape and its wall thickness. In this embodiment, no leaks will develop since there are no component boundaries between the membrane and the filter housing.

A further production variant is to injection mold the membrane into an existing filter housing. Here, the filter housing forms a part of the cavity for the membrane. This production method realizes an optimal fit of the membrane in the filter housing. Furthermore, the membrane can be injection molded in such a way that a permanent connection is created between the membrane and the filter housing.

A particularly advantageous production method is the two-component injection molding process. In this case, both components, the filter housing and the membrane, are produced in the same mold. After the filter housing has been injection molded first, slide gates recede and free the cavity for the membrane. With this production method, a finished component is obtained after unmolding.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
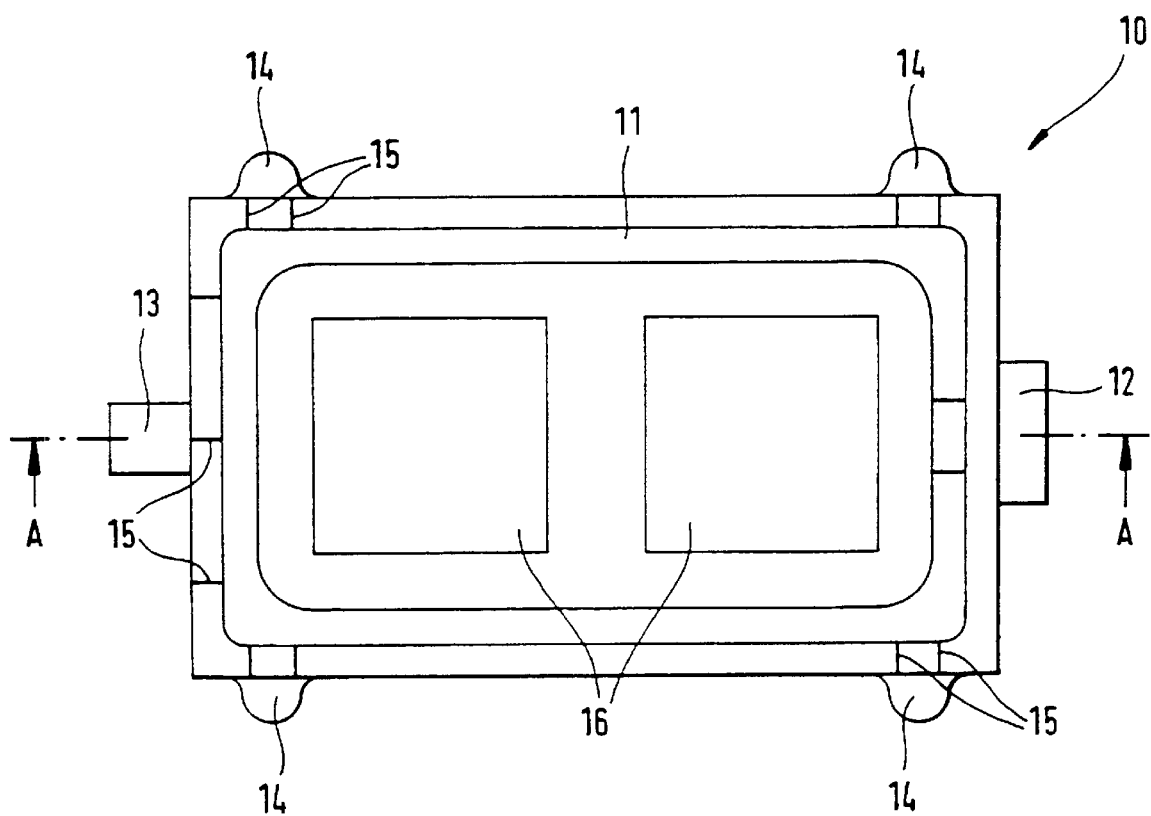
FIG. 1 is a top view of an air filter according to the invention.

FIG. 1 is a top view of an air filter 10. This air filter 10 is essentially formed by an air filter housing 11, which has an inlet 12 and an outlet 13. Since the air filter housing 11 comprises several shaped parts, connecting points 14 are provided to fasten the shaped parts to one another as well as ribs 15 to add rigidity. Two membranes 16 are included in the air filter housing 11. They are acoustically more permeable than the air filter housing 11 and thus emit more sound from the filter interior into the engine compartment. The air filter housing 11 can be made of a talcum-reinforced polypropylene, e.g., PPT20, and the membrane 16 of a thermoplastic elastomer. Both components 11, 16 are produced by injection molding and are subsequently joined using an adhesive.

Figure 2:
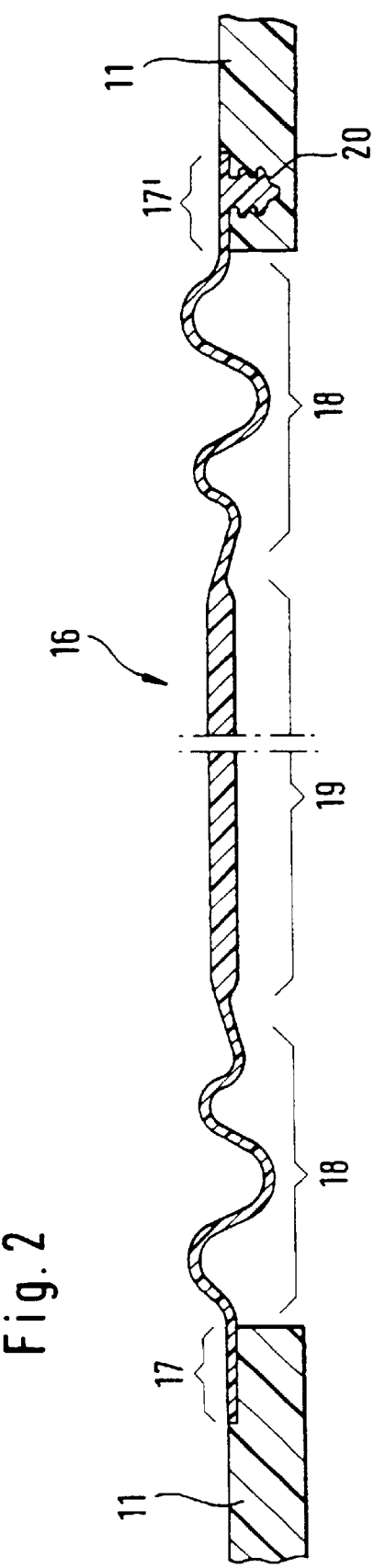
FIG. 2 is a sectional view of an air filter housing membrane.

FIG. 2 shows a sectional view of a membrane 16. Two fastening variants are illustrated. The membrane has a circumferential fastening area 17, an undulating vibration area 18, and a thicker effective sound transmitting area 19. The undulating vibration area 18 serves to support the sound transmitting area 19 and to induce the vibrations. To this end the undulating vibration area 18 has a thinner wall thickness than the central area 19.

The left half of the figure shows the fastening area 17, which can be glued with an adhesive to the air filter housing 11 depicted in FIG. 1.

The right half of the figure shows the fastening area 17' with a sealing lip 20. This sealing lip 20 is pressed into a circumferential groove in the air filter housing 11 shown in FIG. 1.

Figure 3:
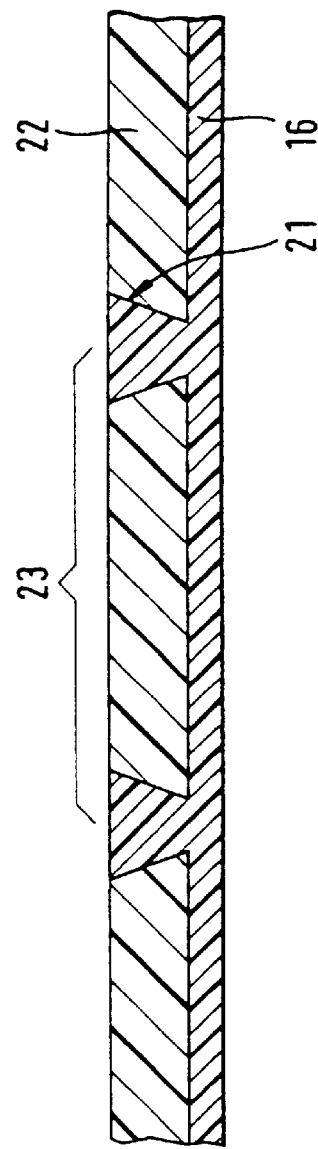
FIG. 3 is a sectional view of a membrane attachment area.

FIG. 3 depicts an attachment area in cross section. In this example, the attachment area is formed by conical bores 21, which are formed in a housing wall 22 of the air filter housing 11 according to FIG. 1 and are filled by the melt from which the membrane is formed. After the melt has solidified, the membrane 16 can no longer be removed from the filter housing 11 without being destroyed. The conical bores 21 are spaced apart at defined intervals 23. Care must be taken that the membrane 16 cannot become detached from the air filter housing 11 and air cannot escape in any operating state.

Figure 4:
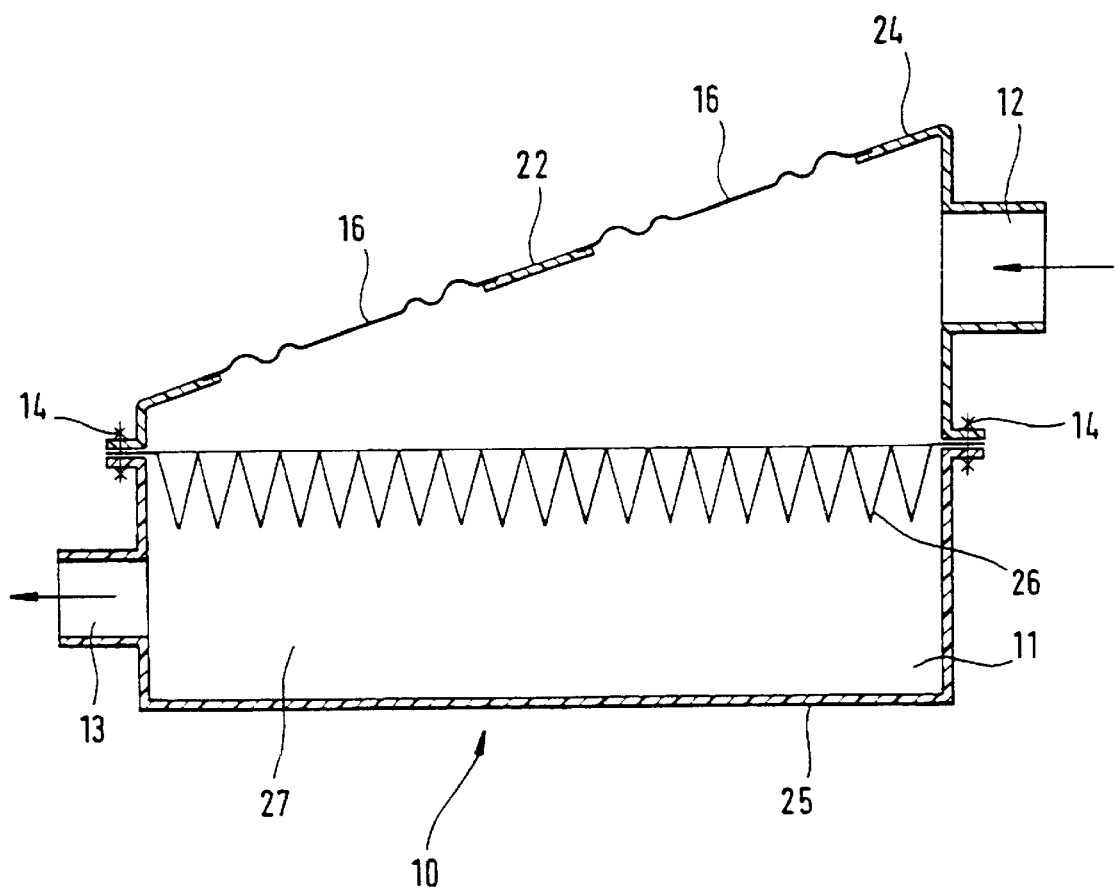
FIG. 4 is a schematic sectional view of an air filter according to the invention.

FIG. 4 is a schematic sketch of an air filter 10 in cross section along lines A—A of FIG. 1. The air filter 10 essentially comprises a two-part air filter housing 11 formed by an upper half 24 and a lower half 25 and encloses a filter space 27. The upper half 24 has an unfiltered air inlet 12 and two undulating membranes 16, which are inserted into the upper half 24. The lower half 25 contains a filtered air outlet 13. Between the upper and the lower halves 24, 25, a filter element 26 is inserted so as to form a seal. To fasten the two halves one on top of the other, the connecting points 14 are screwed together.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling with in the scope of the appended claims and equivalents thereof.

What is claimed is:

1. An air filter for an internal combustion engine, comprising an air filter housing having a housing wall which encloses a filter space, an unfiltered air inlet, and a filtered air outlet, wherein the housing wall includes at least one membrane portion that is more permeable to sound than the rest of the housing wall, and wherein the membrane portion comprises varying wall thicknesses.

2. An air filter according to claim 1, wherein the membrane portion has a generally circular sound transmitting area.

3. An air filter according to claim 1, wherein the membrane has an undulating structure.

4. An air filter for an internal combustion engine, comprising an air filter housing having a housing wall which encloses a filter space, an unfiltered air inlet, and a filtered air outlet, wherein the housing wall includes at least one membrane portion that is more permeable to sound than the rest of the housing wall, and wherein the membrane comprises an undulating peripheral vibration area and a flat central sound transmitting area.

5. An air filter according to claim 1, wherein the membrane is arranged on an end face of the filter housing.

6. An air filter according to claim 1, wherein the filter housing includes attachment areas for an interlocking connection between the membrane and the rest of the housing wall.

* * * * *